United States Patent
Kuske et al.

(10) Patent No.: US 10,934,945 B2
(45) Date of Patent: Mar. 2, 2021

(54) INTERNAL COMBUSTION ENGINE WITH COMPRESSOR, EXHAUST-GAS RECIRCULATION ARRANGEMENT AND PIVOTABLE FLAP

(71) Applicant: Ford Global Technologies, LLC, Dearborn, MI (US)

(72) Inventors: Andreas Kuske, Geulle (NL); Christian Winge Vigild, Aldenhoven (DE); Franz Arnd Sommerhoff, Aachen (DE); Joerg Kemmerling, Monschau (DE); Vanco Smiljanovski, Bedburg (DE); Helmut Matthias Kindl, Aachen (DE); Hanno Friederichs, Aachen (DE)

(73) Assignee: Ford Global Technologies, LLC, Dearborn, MI (US)

( * ) Notice: Subject to any disclaimer, the term of this patent is extended or adjusted under 35 U.S.C. 154(b) by 508 days.

(21) Appl. No.: 15/684,821

(22) Filed: Aug. 23, 2017

(65) Prior Publication Data
US 2018/0058341 A1   Mar. 1, 2018

(30) Foreign Application Priority Data
Aug. 24, 2016   (DE) .......................... 102016215880.5

(51) Int. Cl.
| | |
|---|---|
| *F02D 9/10* | (2006.01) |
| *F02M 26/70* | (2016.01) |
| *F16K 15/14* | (2006.01) |
| *F16K 27/02* | (2006.01) |

(52) U.S. Cl.
CPC ........... *F02D 9/1015* (2013.01); *F02M 26/70* (2016.02); *F16K 15/142* (2013.01); *F16K 27/0218* (2013.01)

(58) Field of Classification Search
CPC ........ F02M 26/04; F02M 26/21; F02M 26/70; F16K 11/052; F16K 27/0277
USPC .................................... 137/326–329.06, 875
See application file for complete search history.

(56) References Cited

U.S. PATENT DOCUMENTS

| | | | |
|---|---|---|---|
| 4,130,094 A | 12/1978 | Gropp | |
| 4,222,356 A | 9/1980 | Ueda et al. | |
| 4,329,965 A * | 5/1982 | Ueda ....................... | F02D 21/08 123/568.18 |

(Continued)

FOREIGN PATENT DOCUMENTS

| | | |
|---|---|---|
| CN | 101268267 A | 9/2008 |
| CN | 201650508 U | 11/2010 |

(Continued)

OTHER PUBLICATIONS

FR-2917801-A1 Faurecia Pub Dec. 2008 (Year: 2008).*

(Continued)

*Primary Examiner* — Jesse S Bogue
(74) *Attorney, Agent, or Firm* — Geoffrey Brumbaugh; McCoy Russell LLP

(57) ABSTRACT

Methods and system are provided for a flap valve having a sealing element. In one example, a system include a front side of the flap valve having a first sealing element and a back side of the flap valve having a second sealing element, where the first sealing element and the second sealing element are located along a circumferential edge of the flap valve and spaced away from its geometric center.

12 Claims, 5 Drawing Sheets

(56) References Cited

U.S. PATENT DOCUMENTS

| | | | | |
|---|---|---|---|---|
| 4,450,867 | A * | 5/1984 | Moore | F16K 11/052 |
| | | | | 131/900 |
| 4,718,457 | A * | 1/1988 | Luger | B65G 53/56 |
| | | | | 137/875 |
| 5,322,087 | A * | 6/1994 | Koudijs | F16K 11/052 |
| | | | | 137/625.44 |
| 5,697,596 | A * | 12/1997 | Kremers | F16K 11/052 |
| | | | | 137/875 |
| 5,937,834 | A | 8/1999 | Oto | |
| 5,938,208 | A | 8/1999 | Yoshida et al. | |
| 6,715,475 | B2 | 4/2004 | Cook | |
| 7,086,416 | B2 * | 8/2006 | Kurian | F16K 27/0272 |
| | | | | 137/625.44 |
| 7,234,444 | B2 | 6/2007 | Nanba et al. | |
| 7,798,135 | B2 | 9/2010 | Bischofberger et al. | |
| 7,992,550 | B2 | 8/2011 | Watanuki et al. | |
| 8,899,215 | B2 | 12/2014 | Sano et al. | |
| 2002/0033194 | A1 * | 3/2002 | Gagnon | F16K 11/052 |
| | | | | 137/875 |
| 2003/0111066 | A1 * | 6/2003 | Veinotte | F02M 26/21 |
| | | | | 123/568.18 |
| 2005/0274459 | A1 * | 12/2005 | Tanase | F16K 1/2261 |
| | | | | 156/345.31 |
| 2009/0277166 | A1 | 11/2009 | Walz | |
| 2011/0036335 | A1 * | 2/2011 | Wood | F02B 33/44 |
| | | | | 123/568.21 |
| 2011/0042599 | A1 | 2/2011 | Arai et al. | |
| 2014/0165975 | A1 | 6/2014 | Lim et al. | |
| 2015/0013789 | A1 | 1/2015 | Hodebourg et al. | |
| 2015/0107565 | A1 * | 4/2015 | Jung | F02M 26/21 |
| | | | | 123/568.11 |
| 2015/0198119 | A1 * | 7/2015 | Kuske | F02M 26/71 |
| | | | | 60/605.2 |
| 2015/0345644 | A1 | 12/2015 | Dominguez et al. | |
| 2016/0032871 | A1 | 2/2016 | Keefover et al. | |
| 2017/0089279 | A1 * | 3/2017 | Yoeda | F02M 26/47 |
| 2018/0171940 | A1 * | 6/2018 | Gonz Lez | F02G 5/02 |

FOREIGN PATENT DOCUMENTS

| | | | | |
|---|---|---|---|---|
| CN | 102052203 | A | | 5/2011 |
| CN | 102080610 | A | | 6/2011 |
| CN | 204267182 | U | | 4/2015 |
| DE | 1061588 | B * | 7/1959 | F16K 15/03 |
| DE | 19819364 | A1 | | 11/1999 |
| DE | 102013113700 | A1 * | 6/2014 | F02D 21/08 |
| DE | 102013107587 | A1 * | 1/2015 | F02M 26/16 |
| DE | 102014114968 | A1 | | 4/2016 |
| EP | 1098085 | A2 | | 5/2001 |
| EP | 1510739 | A1 * | 3/2005 | F02M 26/26 |
| EP | 2592258 | A1 * | 5/2013 | F02M 26/71 |
| FR | 2917801 | A1 * | 12/2008 | F16K 25/00 |
| FR | 2918145 | A1 * | 1/2009 | F16K 1/2261 |
| FR | 2983526 | A1 * | 6/2013 | F02M 26/16 |
| JP | 2014173696 | A * | 9/2014 | F01K 23/101 |
| JP | 2016020686 | A | | 2/2016 |
| WO | 2011048540 | A1 | | 4/2011 |
| WO | 2015182248 | A1 | | 12/2015 |

OTHER PUBLICATIONS

DE-1061588-B to Armaturenbau Jul. 1959 (Year: 1959).*
FR-2918145-A1 to Falchi Jan. 2009 (Year: 2009).*
National Intellectual Property Administration of the People's Republic of China, Office Action and Search Report Issued in Application No. 201710733923.1, Aug. 25, 2020, 12 pages. (Submitted with Partial Translation).

* cited by examiner

INTERNAL COMBUSTION ENGINE WITH COMPRESSOR, EXHAUST-GAS RECIRCULATION ARRANGEMENT AND PIVOTABLE FLAP

CROSS REFERENCE TO RELATED APPLICATION

The present application claims priority to German Patent Application No. 102016215880.5, filed Aug. 24, 2016. The entire contents of the above-referenced application are hereby incorporated by reference in its entirety for all purposes.

FIELD

The present description relates generally to a pivotable flap having a sealing element.

BACKGROUND/SUMMARY

An internal combustion engine of the type mentioned in the introduction is used as a motor vehicle drive unit. Within the context of the present disclosure, the expression "internal combustion engine" encompasses diesel engines and Otto-cycle engines and also hybrid internal combustion engines, which utilize a hybrid combustion process, and hybrid drives which comprise not only the internal combustion engine but also an electric machine which can be connected in terms of drive to the internal combustion engine and which receives power from the internal combustion engine or which, as a switchable auxiliary drive, additionally outputs power.

In recent years, there has been a trend in development towards supercharged engines, wherein the economic significance of said engines for the automobile industry continues to steadily increase.

Supercharging is primarily a method for increasing performance in which the air needed for the combustion process in the engine is compressed, as a result of which a greater air mass can be fed to each cylinder in each working cycle. In this way, the fuel mass and therefore the mean pressure can be increased.

Supercharging is a suitable means for increasing the power of an internal combustion engine while maintaining an unchanged swept volume, or for reducing the swept volume while maintaining the same power. In any case, supercharging leads to an increase in volumetric power output and a more expedient power-to-weight ratio. If the swept volume is reduced, it is thus possible to shift the load collective toward higher loads, at which the specific fuel consumption is lower. By means of supercharging in combination with a suitable transmission configuration, it is also possible to realize so-called downspeeding, with which it is likewise possible to achieve a lower specific fuel consumption.

Supercharging consequently assists in the constant efforts in the development of internal combustion engines to minimize fuel consumption, that is to say to improve the efficiency of the internal combustion engine.

For supercharging, use is often made of an exhaust-gas turbocharger, in which a compressor and a turbine are arranged on the same shaft. The hot exhaust-gas flow is fed to the turbine and expands in the turbine with a release of energy, as a result of which the shaft is set in rotation. The energy supplied by the exhaust-gas flow to the turbine and ultimately to the shaft is used for driving the compressor which is likewise arranged on the shaft. The compressor conveys and compresses the charge air fed to it, as a result of which supercharging of the cylinders is obtained. A charge-air cooler is advantageously provided in the intake system downstream of the compressor, by means of which charge-air cooler the compressed charge air is cooled before it enters the at least one cylinder. The cooler lowers the temperature and thereby increases the density of the charge air, such that the cooler also contributes to improved charging of the cylinders, that is to say to a greater air mass. Compression by cooling takes place.

The advantage of an exhaust-gas turbocharger in relation to a supercharger—which can be driven by means of an auxiliary drive—consists in that an exhaust-gas turbocharger utilizes the exhaust-gas energy of the hot exhaust gases, whereas a supercharger draws the energy required for driving it directly or indirectly from the internal combustion engine and thus adversely affects, that is to say reduces, the efficiency, at least for as long as the drive energy does not originate from an energy recovery source.

If the supercharger is not one that can be driven by means of an electric machine, that is to say electrically, a mechanical or kinematic connection for power transmission is generally required between the supercharger and the internal combustion engine, which also influences the packaging in the engine bay.

The advantage of a supercharger in relation to an exhaust-gas turbocharger consists in that the supercharger can generate, and make available, the required charge pressure at all times, specifically regardless of the operating state of the internal combustion engine. This applies in particular to a supercharger which can be driven electrically by means of an electric machine and is therefore independent of the rotational speed of the crankshaft.

In the previous attempts, it is specifically the case that difficulties are encountered in achieving an increase in power in all engine speed ranges by means of exhaust-gas turbocharging. A relatively severe torque drop is observed in the event of a certain engine speed being undershot. Said torque drop is understandable if one takes into consideration that the charge pressure ratio is dependent on the turbine pressure ratio or the turbine power. If the engine speed is reduced, this leads to a smaller exhaust-gas mass flow and therefore to a lower turbine pressure ratio or lower turbine power. Consequently, toward lower engine speeds, the charge pressure ratio likewise decreases. This equates to a torque drop.

The internal combustion engine to which the present disclosure relates has a compressor for supercharging purposes, wherein, in the context of the present disclosure, both a supercharger that can be driven by means of an auxiliary drive and a compressor of an exhaust-gas turbocharger can be subsumed under the expression "compressor".

It is a further basic aim to reduce pollutant emissions. Supercharging can likewise be expedient in solving this problem. With targeted configuration of the supercharging, it is possible specifically to obtain advantages with regard to efficiency and with regard to exhaust-gas emissions. To adhere to future limit values for pollutant emissions, however, further measures are necessary in addition to the supercharging arrangement.

For example, exhaust-gas recirculation serves for reducing the untreated nitrogen oxide emissions. Here, the recirculation rate $x_{EGR}$ is determined as $x_{EGR} = m_{EGR}/(m_{EGR} + m_{fresh\ air})$, where $m_{EGR}$ denotes the mass of recirculated exhaust gas and $m_{fresh\ air}$ denotes the supplied fresh air. Any oxygen or air recirculated via the exhaust-gas recirculation arrangement may be taken into consideration.

The internal combustion engine according to the disclosure which is supercharged by means of a compressor is also equipped with at least one exhaust-gas recirculation arrangement, wherein the recirculation line, which branches off from the exhaust-gas discharge system, opens into the intake system, so as to form a junction point, upstream of the compressor, as is generally the case in a low-pressure EGR arrangement, in which exhaust gas that has already passed through a turbine arranged in the exhaust-gas discharge system is recirculated to the inlet side. For this purpose, the low-pressure EGR arrangement comprises a recirculation line which branches off from the exhaust-gas discharge system downstream of the turbine and opens into the intake system preferably upstream of the compressor.

The internal combustion engine to which the present disclosure relates furthermore has a valve unit which is arranged in the intake system at the junction point. The valve unit comprises a valve housing and a flap arranged in the valve housing.

The flap, which is delimited circumferentially by an edge, may serve for the adjustment of the fresh-air flow rate supplied via the intake system, and at the same time for the metering of the exhaust-gas flow rate recirculated via the exhaust-gas recirculation arrangement, and is pivotable about an axis running transversely with respect to the fresh-air flow, in such a way that, in a first end position, the front side of the flap blocks the intake system, and at the same time the recirculation line is opened up, and in a second end position, the back side of the flap covers the recirculation line, and at the same time the intake system is opened up. In the above context, both "blocking" and "covering" do not imperatively also mean "closing", or complete blocking and covering.

The axis, running transversely and/or perpendicularly with respect to the fresh-air flow, about which the flap is pivotable need not be a physical axle. Rather, said axis may be a virtual axis, the position of which in relation to the rest of the intake system may furthermore exhibit a certain play, wherein the mounting or fastening is realized in some other way.

Problems may arise, when the exhaust-gas recirculation arrangement is active, if exhaust gas is introduced into the intake system upstream of the compressor. Specifically, condensate may form. In this context, several scenarios are of relevance.

Firstly, condensate can form if recirculated hot exhaust gas meets, and is mixed with, cool fresh air. The exhaust gas cools down, whereas the temperature of the fresh air is increased. The temperature of the mixture of fresh air and recirculated exhaust gas, that is to say the charge-air temperature, lies below the exhaust-gas temperature of the recirculated exhaust gas. During the course of the cooling of the exhaust gas, liquids previously contained in the exhaust gas still in gaseous form, in particular water, may condense if the dew point temperature of a component of the gaseous charge-air flow is undershot.

Condensate formation occurs in the free charge-air flow, contaminants in the charge air often forming the starting point for the formation of condensate droplets.

Secondly, condensate can form when hot exhaust gas and/or the charge air impinges on the internal wall of the intake system or on the internal wall of the valve housing or on the flap, as the wall temperature generally lies below the dew point temperature of the relevant gaseous components. In this context, the valve housing, as part of the intake system, is of particular significance, because the valve housing is generally impinged on with exhaust gas even when the exhaust-gas recirculation arrangement is inactive. The exhaust gas that is situated or static in the valve housing cools down owing to heat conduction, as a result of which condensate can form on the inner side, which is impinged on with exhaust gas, of the valve housing, which condensate collects in the valve housing and, upon switching-on or activation of the exhaust-gas recirculation arrangement, is abruptly introduced into the intake system.

The problem of condensate formation is intensified with increasing recirculation rate, because with the increase of the recirculated exhaust-gas flow rate, the fractions of the individual exhaust-gas components in the charge air, in particular the fraction of the water contained in the exhaust gas, inevitably increase. In the prior art, therefore, the exhaust-gas flow rate recirculated via the low-pressure EGR arrangement is commonly limited in order to prevent or reduce the occurrence of condensation. The required limitation of the low-pressure EGR on the one hand and the high exhaust-gas recirculation rates required for a considerable reduction in the nitrogen oxide emissions on the other hand lead to different aims in the dimensioning of the recirculated exhaust-gas flow rate. The legal requirements for the reduction of the nitrogen oxide emissions highlight the high relevance of this problem in practice.

Condensate and condensate droplets are undesirable and lead to increased noise emissions in the intake system, and possibly to damage of the blades of the at least one compressor impeller. The latter effect is associated with a reduction in efficiency of the compressor.

For this reason, the valve unit or the junction point is preferably positioned as close as possible to the compressor, that is to say arranged in the vicinity of the at least one impeller, such that as short a distance $\Delta$ as possible is formed. An arrangement of the valve unit close to the compressor shortens the path for the hot recirculated exhaust gas from the point at which it is introduced into the intake system at the junction point to the at least one impeller, such that the time available for the formation of condensate droplets in the free charge-air flow is reduced. A formation of condensate droplets is thus counteracted in this way.

In terms of construction, the above concept is generally implemented by virtue of the valve housing—which also belongs to the intake system—being positioned, that is to say installed, between the upstream-situated intake system and the downstream-situated compressor housing. In the first end position, the front side of the flap interacts with the intake system arranged upstream of the flap, or with the walls of said intake system, such that the valve housing and the downstream-situated compressor are substantially sealed off against an ingress of fresh air from the upstream-situated intake system.

Owing to manufacturing inaccuracies in the individual components or parts and installation-related deviations or differences in individual cases, but in particular owing to the play-afflicted mounting of the flap, that is to say owing to the non-fixed position of the pivot axis, which runs transversely with respect to the fresh-air flow, of the flap, the sealing-off of the valve housing with respect to the upstream-situated intake system cannot be realized in a satisfactory manner.

Against this background, it is the object of the present disclosure to provide a supercharged internal combustion engine, wherein the sealing-off of the valve housing with respect to the upstream-situated intake system in the first end position of the flap is of improved quality in relation to the prior art.

Said object is achieved by means of a supercharged internal combustion engine having an intake system for the supply of a charge-air flow, an exhaust-gas discharge system for the discharge of exhaust gas, at least one compressor arranged in the intake system, which compressor is equipped with at least one impeller which is mounted, in a housing, on a rotatable shaft, an exhaust-gas recirculation arrangement comprising a recirculation line which branches off from the exhaust-gas discharge system and which opens into the intake system, so as to form a junction point, upstream of the at least one impeller, and a valve unit which is arranged at the junction point in the intake system and which comprises a valve housing and a flap arranged in the valve housing, the flap, which is delimited circumferentially by an edge, being pivotable about an axis running transversely with respect to the fresh-air flow, in such a way that the flap, in a first end position, blocks the intake system by means of a front side and opens up the recirculation line and, in a second end position, covers the recirculation line by means of an exhaust-gas-side back side and opens up the intake system, which internal combustion engine is distinguished by the fact that the front side of the flap, in the first end position, interacts with a stop in the intake system, which stop is arranged upstream of the flap, in order to block the intake system, the flap being equipped, at least on the front side, with at least one sealing element which, in the first end position of the flap, bears against the stop for the purposes of sealing off the intake system.

The flap of the internal combustion engine according to the disclosure is equipped, at least on the front side, with at least one sealing element. Said sealing element is elastically deformable in terms of its shape and/or its material. Together with a stop, for example a projecting collar, the flap forms the seal or the sealing-off means of the intake system for preventing an inflow of fresh air.

The provision of at least one sealing element noticeably improves the sealing-off action of the intake system in the first end position of the flap, because, in particular, a play-afflicted mounting of the flap, that is to say the non-fixed position of the pivot axis of the flap, can be or is compensated by means of the deformable sealing element.

Nevertheless, the sealing-off action according to the disclosure using at least one sealing element does not have to be hermetic, that is to say fully gas-tight. In this respect, as before, a sealing-off action in the above sense does not imperatively mean a complete sealing-off action. A flap according to the disclosure may also be formed by a conventional flap which has been enhanced or modified, in context of a reworking and/or retrofitting process, to form a flap according to the disclosure.

In this way, the object on which the disclosure is based is achieved, that is to say a supercharged internal combustion engine is provided which is improved in relation to the prior art, wherein, in particular, the sealing-off of the valve housing with respect to the upstream-situated intake system in the first end position of the flap is of improved quality.

In the context of the exhaust-gas recirculation, it is preferable for exhaust gas that has been subjected to exhaust-gas aftertreatment, in particular in a particle filter, to be conducted through the compressor. In this way, depositions in the compressor which change the geometry of the compressor, in particular the flow cross sections, and impair the efficiency of the compressor, can be prevented.

Further advantageous embodiments of the supercharged internal combustion engine will be discussed in conjunction with the subclaims.

Embodiments of the supercharged internal combustion engine comprise where the axis is arranged close to the edge, that is to say close to an edge section of the flap. In this embodiment, the flap is laterally mounted and pivotable similarly to a door, specifically at one of its edges. This distinguishes the flap according to the disclosure from centrally mounted shut-off elements or flaps, such as for example a butterfly valve.

Embodiments of the supercharged internal combustion engine comprise where the axis is arranged close to the wall, that is to say close to a wall section of the intake system. The intake system generally performs, with regard to the flap, the function of a frame, that is to say borders the flap. In this respect, an embodiment in which the axis is arranged close to an edge section of the flap is generally also an embodiment in which the axis is arranged close to a wall section of the intake system. The major advantage of both embodiments is that, in the second end position, the flap is positioned close to the wall, such that a completely free passage for the fresh air is realized.

Embodiments of the supercharged internal combustion engine comprise where the at least one sealing element completely covers the front side of the flap. Then, the at least one sealing element is in the form of a coating or lining. This embodiment is characterized by simple manufacture of the flap, wherein, to form a flap according to the disclosure, it is merely necessary for a conventional flap to be coated with an elastically deformable material.

Said coating may also serve as thermal insulation. The flap, which is cooled by the relatively cool fresh air at the front side, then has a back side which is less cool owing to reduced or impeded heat conduction, whereby the condensate formation is counteracted.

Embodiments of the supercharged internal combustion engine comprise where the at least one sealing element has a strip-like form and, at least in sections, jointly forms the edge of the flap and the front side of the flap.

The flap may have a cutout or recess in the edge region for receiving a strip-like sealing element, such that the sealing element positioned in the cutout jointly forms the edge and the front side of the flap. Here, the flap serves as a carrier for receiving and stabilizing the sealing element.

In this context, too, embodiments of the supercharged internal combustion engine may comprise where the front side of the flap is planar.

If the at least one sealing element has a strip-like form, embodiments of the supercharged internal combustion engine comprise where the back side of the flap is equipped with at least one sealing element, wherein the back side of the flap is designed similarly to the front side of the flap. This reduces errors during the assembly process, because, in some cases, it is no longer necessary to make a distinction between the back side of the flap and the front side of the flap.

Embodiments of the supercharged internal combustion engine comprise where the at least one sealing element has a strip-like form and, at least in sections, completely forms the edge of the flap. The lateral edge of the flap is, in the present case, formed at least in sections from material of the at least one sealing element.

Embodiments of the supercharged internal combustion engine comprise where the at least one sealing element has a strip-like form and surrounds the flap over the full circumference at the edge.

Embodiments of the supercharged internal combustion engine comprise where which the at least one sealing element is a bead-like sealing lip which is arranged at least in sections at the edge of the flap on the front side.

By contrast to a sealing element of strip-like form, a bead-like sealing lip projects from the front side of the flap in all cases. The bead-like sealing lip may however also be mounted in a cutout or recess of the flap, but then has a part which is not arranged in the cutout or recess but which projects.

In this context, embodiments of the supercharged internal combustion engine comprise where the bead-like sealing lip has a U-shaped cross section. Then, the sealing lip is preferably elastically deformable at least inter alia in terms of its shape.

In this context, embodiments of the supercharged internal combustion engine comprise where the bead-like sealing lip has a V-shaped cross section.

In this context, embodiments of the supercharged internal combustion engine comprise where the bead-like sealing lip has a triangular cross section.

In the case of a bead-like sealing lip being used, embodiments of the supercharged internal combustion engine comprise where the bead-like sealing lip, at least in sections, jointly forms the edge of the flap.

In the case of a bead-like sealing lip being used, embodiments of the supercharged internal combustion engine may also include where the bead-like sealing lip surrounds the flap over the full circumference at the edge.

Embodiments of the supercharged internal combustion engine comprise where the at least one sealing element is elastically deformable.

Embodiments of the supercharged internal combustion engine comprise where the at least one sealing element comprises a non-deformable carrier structure. The carrier structure then receives the deformable sealing material.

Embodiments of the supercharged internal combustion engine may include where the flap is of modular construction. This is generally the case in all of the above embodiments.

Embodiments of the supercharged internal combustion engine comprise where at least one exhaust-gas turbocharger is provided which comprises a turbine arranged in the exhaust-gas discharge system and a compressor arranged in the intake system. With regard to the above embodiment, reference is made to the statements already made in conjunction with the exhaust-gas turbocharging arrangement, in particular the highlighted advantages.

In this context, embodiments of the supercharged internal combustion engine comprise where the at least one compressor is the compressor of the at least one exhaust-gas turbocharger.

Embodiments of the supercharged internal combustion engine comprise where the at least one compressor is a radial compressor. This embodiment permits dense packaging with regard to the supercharging arrangement. The compressor housing may be configured as a spiral or worm housing. In the case of an exhaust-gas turbocharger, the diversion of the charge-air flow in the compressor of the exhaust-gas turbocharger can advantageously be utilized for conducting the compressed charge air on the shortest path from the outlet side, on which the turbine of the exhaust-gas turbocharger is commonly arranged, to the inlet side.

In this connection, embodiments comprise the turbine of the at least one exhaust-gas turbocharger is a radial turbine. This embodiment likewise permits dense packaging of the exhaust-gas turbocharger and thus of the supercharging arrangement as a whole.

By contrast to turbines, compressors are defined in terms of their exit flow. A radial compressor is thus a compressor whose flow exiting the rotor blades runs substantially radially. In the context of the present disclosure, "substantially radially" means that the speed component in the radial direction is greater than the axial speed component.

Embodiments of the supercharged internal combustion engine comprise where the at least one compressor is of axial type of construction. The flow exiting the impeller blades of an axial compressor runs substantially axially.

Embodiments of the supercharged internal combustion engine comprise where the at least one compressor has an inlet region which runs coaxially with respect to the shaft of the at least one impeller and which is designed such that the flow of charge air approaching the at least one impeller runs substantially axially.

In the case of an axial inflow to the compressor, a diversion or change in direction of the charge-air flow in the intake system upstream of the at least one impeller is often omitted, whereby unnecessary pressure losses in the charge-air flow owing to flow diversion are avoided, and the pressure of the charge air at the inlet into the compressor is increased. The absence of a change in direction also reduces the contact of the exhaust gas and/or charge air with the internal wall of the intake system and/or with the internal wall of the compressor housing, and thus reduces the heat transfer and the formation of condensate.

In the case of at least one exhaust-gas turbocharger being used, embodiments of the supercharged internal combustion engine comprise where the recirculation line branches off from the exhaust-gas discharge system downstream of the turbine of the at least one exhaust-gas turbocharger, in the manner of a low-pressure EGR arrangement.

In contrast to a high-pressure EGR arrangement, in which exhaust gas extracted from the exhaust-gas discharge system upstream of the turbine is introduced into the intake system, specifically preferably downstream of the compressor, in the case of a low-pressure EGR arrangement exhaust gas which has already flowed through the turbine is recirculated to the inlet side. For this purpose, the low-pressure EGR arrangement comprises a recirculation line which branches off from the exhaust-gas discharge system downstream of the turbine and which opens into the intake system upstream of the compressor.

The low-pressure EGR arrangement in relation to the high-pressure EGR arrangement is that the exhaust-gas flow introduced into the turbine during exhaust-gas recirculation is not reduced by the recirculated exhaust-gas flow rate. The entire exhaust-gas flow is always available at the turbine for generating an adequately high charge pressure.

The exhaust gas which is recirculated via the low-pressure EGR arrangement to the inlet side, and preferably cooled, is mixed with fresh air upstream of the compressor. The mixture of fresh air and recirculated exhaust gas produced in this way forms the charge air or combustion air which is supplied to the compressor and compressed.

Embodiments of the supercharged internal combustion engine comprise where a first shut-off element is arranged in the exhaust-gas discharge system downstream of the branching point of the recirculation line. The first shut-off element can be used for increasing the exhaust-gas pressure upstream of the shut-off element in the exhaust-gas discharge system, and can thus be utilized for increasing the pressure gradient between the exhaust-gas discharge system and the intake system. This offers advantages in particular in the case of high recirculation rates, which require a greater pressure gradient.

Embodiments of the supercharged internal combustion engine comprise where a second shut-off element is arranged in the intake system upstream of the junction point. The second shut-off element serves, at the inlet side, for reducing the pressure in the intake system, and is thus—like the first shut-off element—conducive to increasing the pressure gradient between the exhaust-gas discharge system and the intake system.

In this connection, embodiments of the supercharged internal combustion engine comprise where the first and/or second shut-off element is a pivotable or rotatable flap. In the case of an internal combustion engine according to the disclosure, the pivotable flap of the valve unit can form the second shut-off element.

To improve the torque characteristic of the supercharged internal combustion engine, it may be desired to provide two or more exhaust-gas turbochargers, for example multiple exhaust-gas turbochargers connected in series. By connecting two exhaust-gas turbochargers in series, of which one exhaust-gas turbocharger serves as a high-pressure stage and one exhaust-gas turbocharger serves as a low-pressure stage, the compressor characteristic map can advantageously be expanded, specifically both in the direction of smaller compressor flows and also in the direction of larger compressor flows.

In particular, with the exhaust-gas turbocharger which serves as a high-pressure stage, it is possible for the surge limit to be shifted in the direction of smaller compressor flows, as a result of which high charge pressure ratios can be obtained even with small compressor flows, which considerably improves the torque characteristic in the lower engine speed range. This is achieved by designing the high-pressure turbine for small exhaust-gas mass flows and by providing a bypass line by means of which, with increasing exhaust-gas mass flow, an increasing amount of exhaust gas is conducted past the high-pressure turbine.

Furthermore, the torque characteristic may be improved by means of multiple turbochargers arranged in parallel, that is to say by means of multiple turbines of relatively small turbine cross section arranged in parallel, wherein turbines are activated successively with increasing exhaust-gas flow rate.

A shift of the surge limit toward smaller charge-air flows is also possible in the case of turbochargers arranged in parallel, such that, in the presence of low charge-air flow rates, it is possible to provide charge pressures high enough to thereby ensure a satisfactory torque characteristic of the internal combustion engine at low engine speeds.

Furthermore, the response behavior of an internal combustion engine supercharged in this way is considerably improved in relation to a similar internal combustion engine with a single exhaust-gas turbocharger, because the relatively small turbines are less inert, and the rotor of a smaller-dimensioned turbine and of a smaller-dimensioned compressor can be accelerated more rapidly.

Embodiments of the supercharged internal combustion engine may comprise where the recirculation line is equipped with a valve which comprises a valve body which is connected, and thereby mechanically coupled, to the flap, a pivoting of the flap causing an adjustment or movement of the valve in space. The flap can consequently serve as an actuating device for the valve.

All variants of the above embodiment have in common the fact that the flap serves only for the setting of the air flow rate supplied via the intake system, and not for the metering of the recirculated exhaust-gas flow rate. The latter is effected by means of the valve, which is fitted in the recirculation line and/or lies on the mouth of the recirculation line and serves as an EGR valve.

Embodiments of the supercharged internal combustion engine comprise where the junction point is formed and arranged in the vicinity of, at a distance $\Delta$ from, the at least one impeller.

An arrangement of the junction point close to the compressor counteracts the formation of condensate. Furthermore, a swirl introduced into the flow using the flap remains effective, that is to say is still pronounced, at the point at which the charge air enters the impeller.

Specifically, embodiments may comprise where the flap is not planar and has at least one deformation, as an unevenness, at least on the front side. The deformation of the flap gives rise to expedient flow effects. A substantially axial charge-air flow or fresh-air flow can have a speed component transverse with respect to the shaft of the compressor, that is to say a swirl, forcibly imparted to it by means of the flap. In this way, the surge limit of the compressor can be shifted toward smaller charge-air flows, whereby relatively high charge pressure ratios are achieved even in the case of small charge-air flows.

In this connection, embodiments may include, for the distance $\Delta$, the following applies: $\Delta \leq 2.0 D_V$ or $\Delta \leq 1.5 D_V$, where $D_V$ denotes the diameter of the at least one impeller. Embodiments are advantageous in which, for the distance $\Delta$, the following applies: $\Delta \leq 1.0 D_V$, preferably $\Delta \leq 0.75 D_V$.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

The following description relates to systems and methods for a supercharged internal combustion engine having an intake system for the supply of a charge-air flow, an exhaust-gas discharge system for the discharge of exhaust gas, at least one compressor arranged in the intake system, which compressor is equipped with at least one impeller which is mounted, in a housing, on a rotatable shaft, an exhaust-gas recirculation arrangement comprising a recirculation line which branches off from the exhaust-gas discharge system and which opens into the intake system, so as to form a junction point, upstream of the at least one impeller, and a valve unit which is arranged at the junction point in the intake system and which comprises a valve housing and a flap arranged in the valve housing, the flap, which is delimited circumferentially by an edge, being pivotable about an axis running transversely with respect to the fresh-air flow, in such a way that the flap, in a first end position, blocks the intake system by means of a front side and opens up the recirculation line and, in a second end position, covers the recirculation line by means of an exhaust-gas-side back side and opens up the intake system.

Figure 1A:
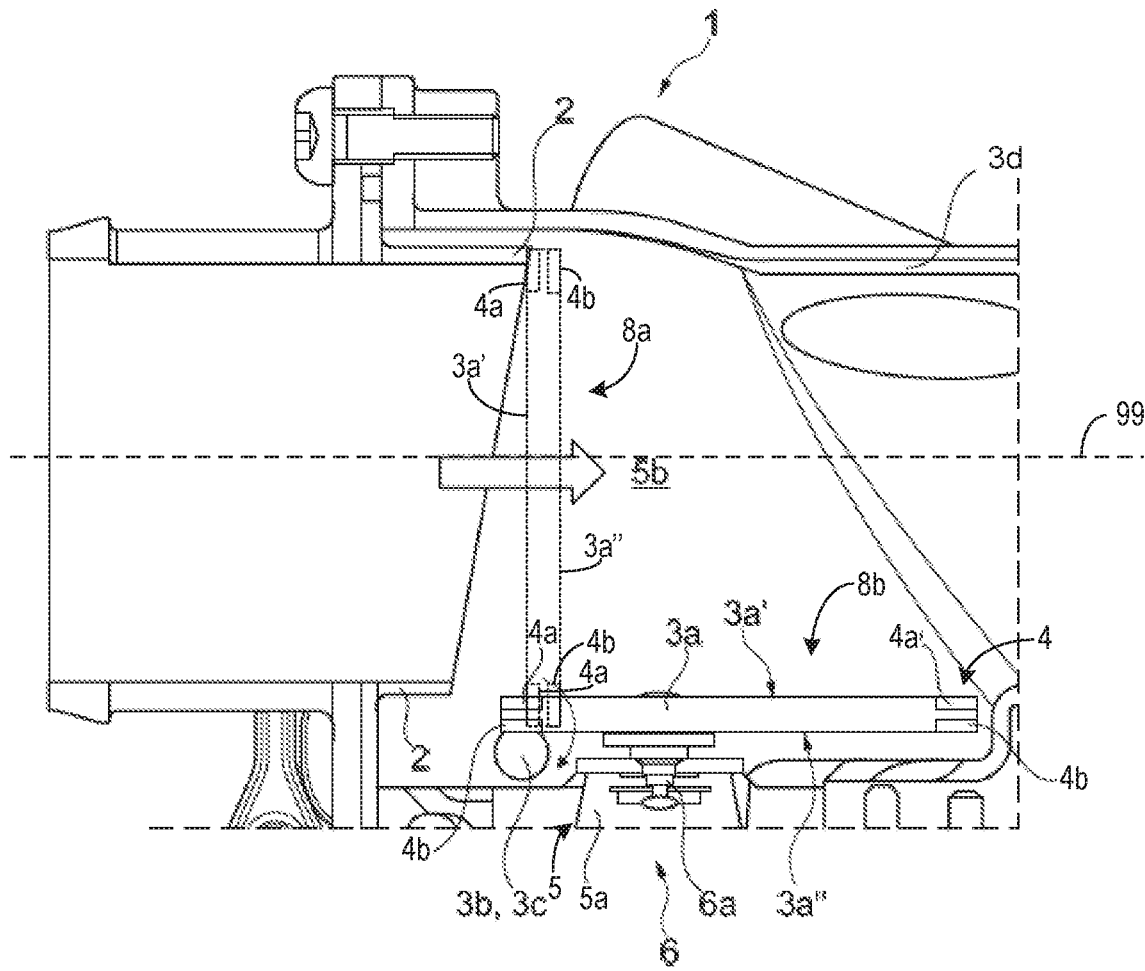
FIG. 1A schematically shows, in a side view, the valve unit, arranged in the intake system, of a first embodiment of the internal combustion engine together with exhaust-gas recirculation arrangement, partially in section.
Figure 1B:
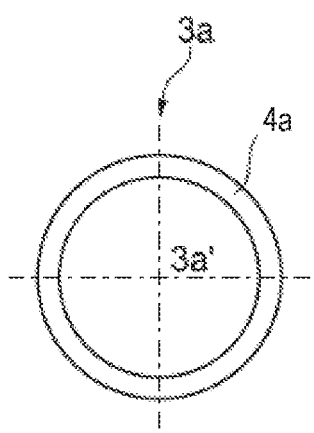
FIG. 1B schematically shows, in a plan view of the front side, the flap of the embodiment illustrated in FIG. 1A.

FIG. 1A shows a valve being arranged in a junction between an intake passage, an exhaust gas recirculation (EGR) passage, and a compressor housing. The valve is illustrated as a circular flap valve having a sealing element arranged thereon. An example shape of the sealing element is shown in FIG. 1B, where the sealing element is substantially circular. The sealing element may be arranged on one or more of a front side and a backside of the flap.

Figure 2:
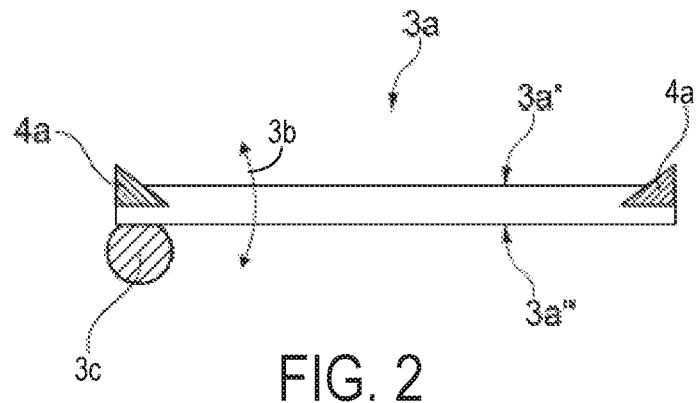
FIG. 2 schematically shows, in a side view, the flap of a second embodiment of the internal combustion engine together with pivot axis.
Figure 3:
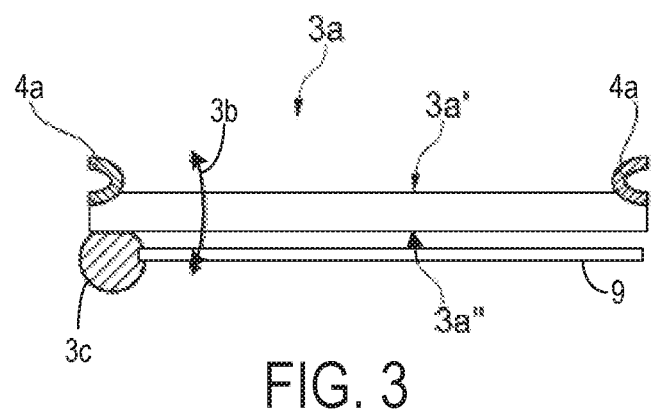
FIG. 3 schematically shows, in a side view, the flap of a third embodiment of the internal combustion engine together with pivot axis.

FIG. 2 shows a first embodiment of the sealing element, where the sealing element comprises a substantially triangular cross-section. FIG. 3 shows a second embodiment of the sealing element, where the sealing element comprises a substantially C-shaped cross-section.

Figure 4A:
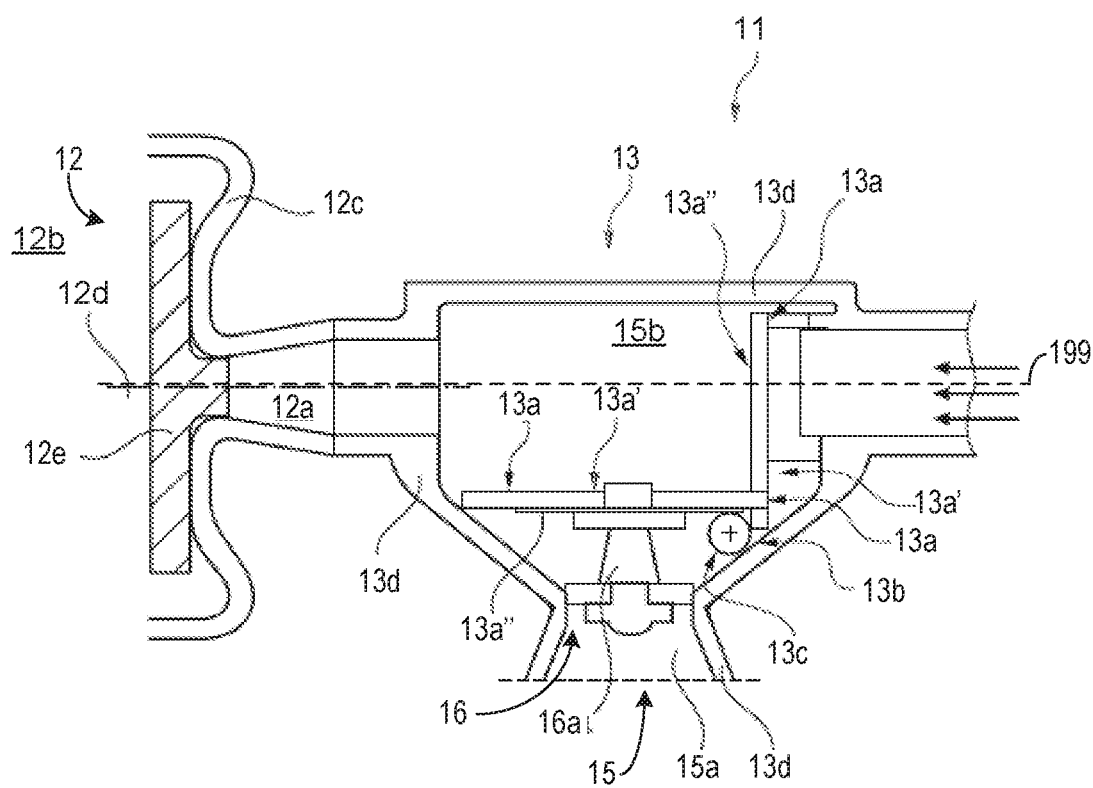
FIG. 4A schematically shows, in a side view, the compressor, arranged in the intake system, of a first embodiment of the internal combustion engine together with exhaust-gas recirculation arrangement and valve unit, partially in section.
Figure 4B:
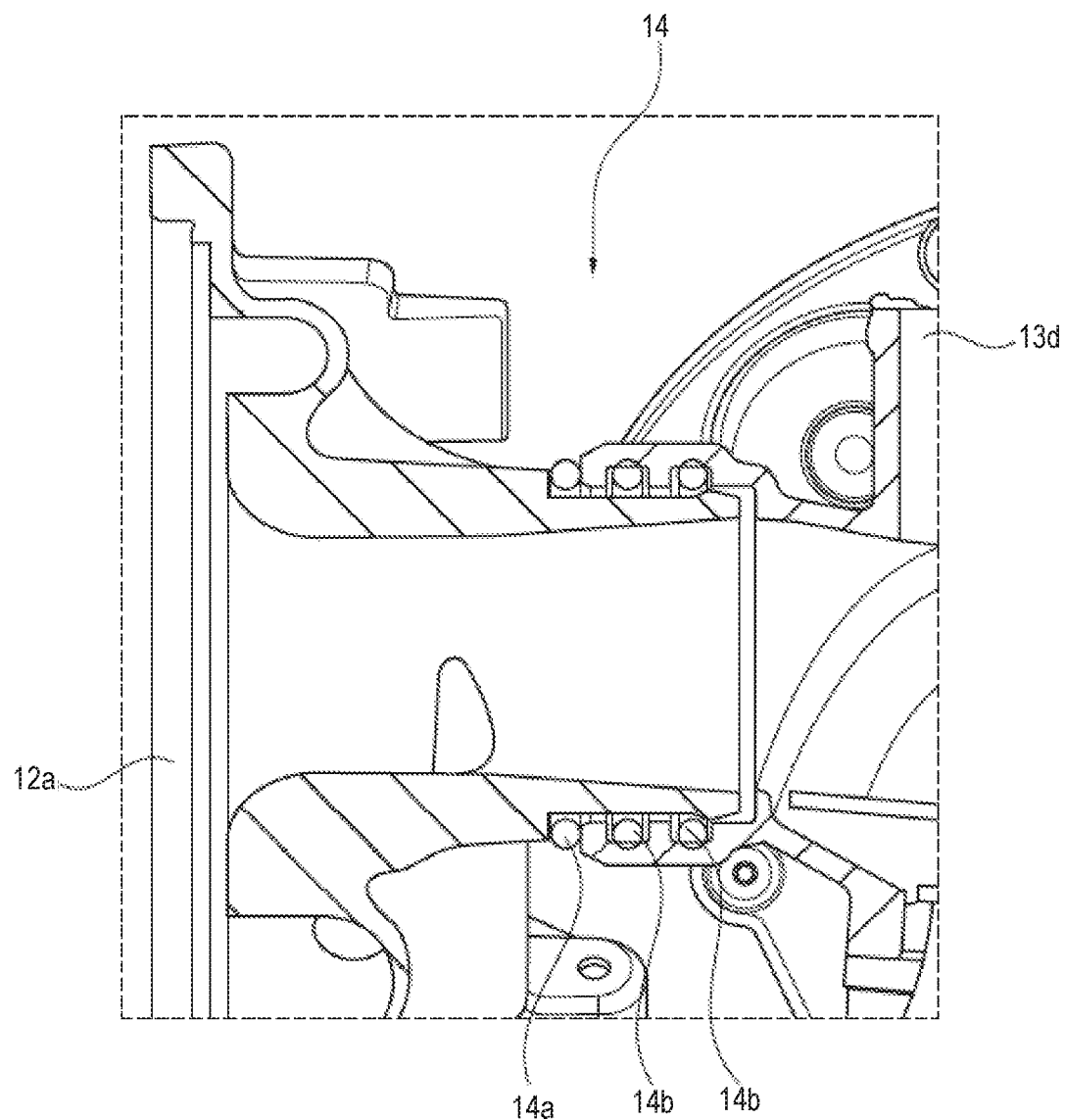
FIG. 4B shows the connection between the compressor housing and the valve housing.
Figure 5:
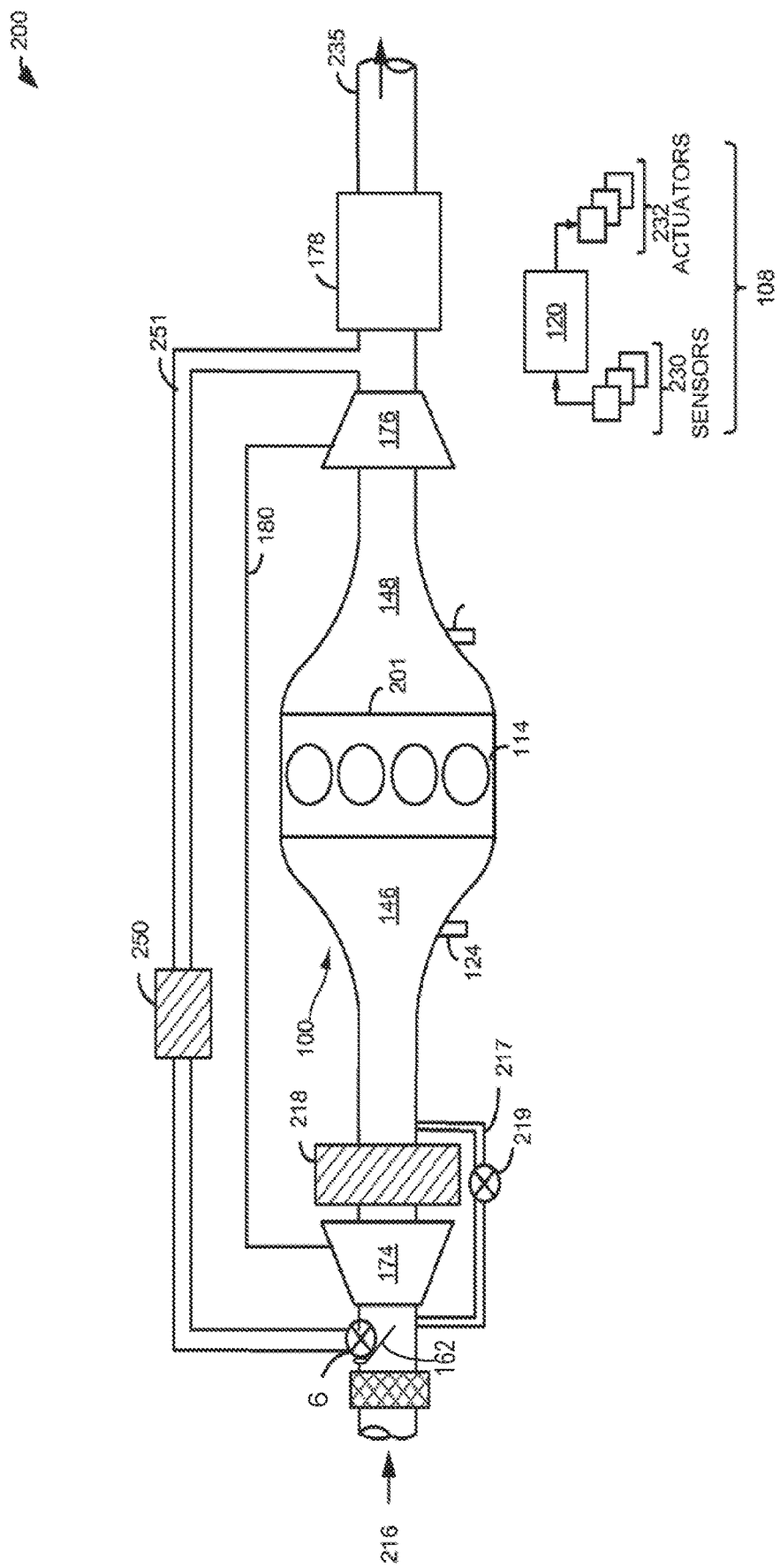
FIG. 5 shows a schematic of an engine having at least one cylinder.

FIG. 4A shows an example of the valve housing being coupled to the compressor housing. FIG. 4B shows one or more coupling elements between the valve housing and the compressor housing. The coupling between the valve housing and the compressor housing may reduce condensate formation upstream of the compressor when EGR flows thereto. FIG. 5 shows an engine schematic illustrating a single cylinder of a plurality of cylinders. The engine may be turbocharger via the turbocharger described above.

FIGS. 1A-4B show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example. It will be appreciated that one or more components referred to as being "substantially similar and/or identical" differ from one another according to manufacturing tolerances (e.g., within 1-5% deviation).

FIG. 1A schematically shows, in a side view, a valve unit 3, arranged in an intake system 1, of a first embodiment of the internal combustion engine together with exhaust-gas recirculation arrangement 5, partially in section.

For the supply of the charge air to the cylinders, the internal combustion engine has the intake system 1, and for the supercharging of the cylinders, an exhaust-gas turbocharger (shown in FIG. 4A) is provided which comprises a turbine arranged in an exhaust-gas discharge system and a compressor arranged in the intake system 1. The compressor has a rotatably mounted impeller, wherein the shaft of the impeller lies in the plane of the drawing of FIG. 1A and runs horizontally parallel to central axis 99. The compressor has an inlet region which runs coaxially with respect to the shaft and is formed such that the section of the intake system 1 upstream of the compressor does not exhibit any changes in direction, and the flow of charge air (indicated by the arrow) approaching the compressor and the impeller thereof runs substantially axially (not illustrated).

The internal combustion engine is furthermore equipped with the exhaust-gas recirculation arrangement 5 which comprises a recirculation line 5a which branches off from the exhaust-gas discharge system downstream of the turbine and which opens into the intake system 1, so as to form a junction point 5b, upstream of the compressor. In the present case, the junction point 5b is arranged close to, at a small distance from, the compressor, as will be described below in greater detail with respect to FIG. 4A.

At the junction point 5b there is arranged a valve unit 3 which comprises a valve housing 3d and a flap 3a arranged in the valve housing 3d.

An EGR valve 6 which is likewise positioned in the valve housing 3d serves for the adjustment of the recirculated exhaust-gas flow rate. The EGR valve 6 comprises a valve body 6a which covers the recirculation line 5a in the illustrated position and which is connected, and thereby mechanically coupled, to the pivotable flap 3a, a pivoting of the flap 3a causing an adjustment of the valve body 6a, that is to say a movement or rotation of the valve body 6a, in space. Consequently, the flap 3a serves as an actuating device for the valve 6 or the valve body 6a.

The flap 3a is pivotable about an axis running transversely with respect to the fresh-air flow and the central axis 99. Said axis which runs transversely with respect to the fresh-air flow and about which the flap 3a is pivotable is perpendicular to the plane of the drawing and serves as a mounting 3c for the flap 3a. In the present case, said axis is arranged close to an edge section of the flap 3a and close to a wall section of the intake system 1 or of the valve unit 3, such that the flap 3a is laterally mounted, similarly to a door.

FIG. 1A shows the flap 3a in a second end position 8b, in which the flap 3a extends parallel to the virtual elongation of the compressor shaft and the central axis 99. The back side 3a" of the flap 3a covers the recirculation line 5a of the exhaust-gas recirculation arrangement 5, whereas the intake system 1 is opened up. The flap 3a serves only for adjusting the air flow rate supplied via the intake system 1, and not for the metering of the recirculated exhaust-gas flow rate. The latter is performed by the EGR valve 6. The EGR valve 6 itself, like the flap 3*a* itself, is illustrated only in the second end position of the flap 3*a*.

In some embodiments, mechanically coupling the flap 3*a* to the valve body 6*a* includes actuating the valve body 6*a* to an at least partially open position when the flap 3*a* moves outside of the second end position 8*b* toward the first end position 8*a*. As such, the valve body 6*a* may now be actuated to a position where exhaust gas recirculate may flow therethrough. As such, exhaust gas recirculate may flow to the junction 5*b* when an actuator of the EGR valve 6 moves a portion of the EGR valve 6 to an at least partially open position and when the flap 3*a* is outside of the second end position 8*b* such that the valve body 6*a* is also configured to flow exhaust gas recirculate to the junction 5*b*.

Additionally or alternatively, the flap 3*a* may be mechanically coupled to the valve body 6*a* such that it depresses the valve body 6*a*, thereby allowing the EGR valve 6 to leak at least some exhaust gas recirculate toward the flap 3*a*. In this way, small amounts of exhaust gas recirculate may flow into the junction 5*b* when the flap 3*a* is in the second end position 8*b*. In one example, a small amount of exhaust gas recirculate is less than a threshold amount, where the threshold amount is based on a lowest amount of exhaust gas recirculate demanded for intake air dilution. In this example, the EGR valve 6 may be a poppet valve, with the valve body 6*a* being configured to actuate when the flap 3*a* is in the second end position 8*b*.

In a first end position 8*a*, shown by the flap 3*a* in dashed lines, the flap 3*a* is approximately perpendicular to the virtual elongation of the compressor shaft and the central axis 99, the flap 3*a*, by means of its front side 3*a'*, blocks the intake system 1.

Said another way, the flap 3*a* is adjustable from the first position 8*a* to the second position 8*b* and vice-versa via directions from a controller to the actuator in the mounting 3*c* based on one or more engine operating parameters. The first position 8*a* includes orienting the front side 3*a'* and the back side 3*a"* in a direction substantially parallel to the vertical axis 98. In the first position 8*a*, the front side 3*a'* may be pressed against a downstream extreme end of the intake passage 7, wherein the front side 3*a'* is substantially blocking incoming intake air flow from flowing to the compressor. In this way, the first position 8*a* may also be referred to as a fully closed position. In one example, the seal between the front side 3*a* and the intake passage 7 is not hermetic and a relatively small amount of incoming intake air may flow from the intake passage 7 to the compressor (e.g., 5% or less of a maximum amount of allowable intake air flow when the flap 3*a* is in a fully open position). In another example, the seal between the front side 3*a'* and the intake passage 7 is hermetic when the flap 3*a* is in the first position 8*a* and substantially zero intake air flows to the compressor.

The second position 8*b* includes orienting the front side 3*a'* and the back side 3*a"* in a direction substantially parallel to the central axis 99, the compressor shaft 2*d*, and the direction of incoming intake air flow. In the second position 8*b*, the back side 3*a"* is pressed against a wall of the junction point 5*b* upstream of the compressor and downstream of the mounting 3*c*. As shown, the back side 3*a"* substantially blocks the recirculation line 5*a* from flowing EGR to the junction point 5*b* and the compressor. As such, when the flap 3*a* is in the second position 8*b*, a maximum amount of intake air flow may flow from the intake passage 7, through the junction point 5*b*, and into the compressor with little to no EGR flow flowing therewith. Herein, the second position 8*b* may be interchangeably referred to as the fully open position, where in the fully open position, intake air flows freely to the compressor with little to no obstructions and where EGR does not flow to the compressor. When in the fully open position, only EGR may contact the back side 3*a"*, while the front side 3*a'* is in contact with only incoming intake air flow.

The flap 3*a* may be actuated between the first position 8*a* and the second position 8*b* such that the flap 3*a* may be held at one of a variety of positions between the first 8*a* and second 8*b* positions. These positions may be referred to as more open and more closed positions, where a more open position is closer to the fully open position than it is to the fully closed position. Thus, the more closed position is closed to the fully closed position than it is to the fully open position. As such, a more open position may allow more intake air to flow to the compressor than a more closed position.

For this purpose, the flap 3*a* is equipped with a plurality of sealing elements 4. On the front side 3*a'*, there is a first sealing element 4*a* which, in the first end position of the flap 3*a*, bears against a projecting collar 2 of the intake system 1 for the purposes of sealing off the intake system 1. It will be appreciated that the sealing elements 4 may be comprised of a malleable material such that the sealing elements 4 are at least partially flexible. As such, the sealing elements 4 may depress and/or give when pressed against a surface to allow a seal between the flap 3*a* and a surface to increase. In one example, the seal is not hermetic and gas may leak therethrough. However, an amount of gas leaked with the flap 3*a* having the sealing elements 4 is less than an amount of gas leaked for a flap omitting the sealing elements 4. In one example, the seal is hermetic and no gas leaks between the sealing elements 4 and a corresponding surface onto which a seal is pressed against.

There is a second sealing element 4*b* which is arranged on the back side 3*a"*. The second sealing element 4*b* is substantially identical to the first sealing element 4*a*, in one example. Additionally or alternatively, the second sealing element 4*b* may differ from the first sealing element 4*a* in one or more of size, shape, and material. For example, the first sealing element 4*a* may be a continuous circle and the second sealing element 4*b* may be a discontinuous circle. In one example, the first and second sealing elements 4*a* and 4*b* may be strip-like.

As shown, the first sealing element 4*a* and the second sealing element 4*b* do not touch, in one example. The first sealing element 4*a* may only contact intake air and the second sealing element 4*b* may only contact exhaust gas recirculate.

To receive the first and second sealing elements 4*a* and 4*b*, the flap 3*a* has a cutout in an edge region on both the front side 3*a'* and the back side 3*a"*, such that the first sealing element 4*a* positioned in the cutout forms the edge of the front side 3*a'* of the flap 3*a*. Similarly, the second sealing element 4*b* positioned in the cutout forms the edge of the back side 3*a"* of the flap 3*a*. Here, the front side 3*a'* of the flap 3*a* is planar. The back side 3*a"* of the flap 3*a* is formed similarly to the front side 3*a'* of the flap 3*a*. It will be appreciated that the front side 3*a'* and the back side 3*a"* may be different in shape and/or the cutout along their edges may be different such that a shape of the first sealing element 4*a* and the second sealing element 4*b* may be different.

The sealing elements 4 surround the flap 3*a* over the full circumference at the edge, as can be seen in FIG. 1B which, schematically and in a plan view of the front side 3*a'*, shows the circular flap 3*a* of the embodiment illustrated in FIG. 1A.

Specifically, the FIG. 1B shows the first sealing element 4a traversing an outer circumferential edge of the front side 3a'. As shown, the first sealing element 4a is contiguous and made from a single piece. The second sealing element 4b may be similarly arranged on the back side 3a" as the first sealing element 4a is arranged on the front side 3a'.

FIG. 2 schematically shows, in a side view, the flap 3a of a second embodiment of the internal combustion engine together with pivot axis 3b. It is sought to explain only the differences in relation to the embodiment illustrated in FIGS. 1A-1B, for which reason reference is otherwise made to FIGS. 1A-1B. The same reference signs have been used for the same parts and components.

As can be seen from FIG. 2, an embodiment of the first sealing element 4a is shown as a bead-like sealing lip, which has a triangular cross section and which projects from the front side 3a' of the flap 3a. The exhaust-gas-side back side 3a" of the flap 3a has no sealing element, and is of planar form. It will be appreciated that the back side 3a" may include the second sealing element (e.g., second sealing element 4b of FIG. 1A) in the embodiment of FIG. 2 without departing from the scope of the present disclosure.

FIG. 3 schematically shows, in a side view, the flap 3a of a third embodiment of the internal combustion engine together with pivot direction 3b. It is sought to explain only the differences in relation to the embodiment illustrated in FIG. 2. The same reference signs have been used for the same parts and components.

As can be seen from FIG. 3, the flap 3a is equipped, on the front side 3a', with the first sealing element 4a having a bead-like shape, which, by contrast to the embodiment of FIG. 2, has a U-shaped cross section.

FIG. 3 further comprises, the flap 3a comprising adjacent to the exhaust-gas-side back side 3a", with thermal insulation 9. In one example, the thermal insulation 9 may be an insulating plate spaced away from the flap 3 and physically coupled to the mounting 3c. Herein, the thermal insulation 9 is referred to as insulating plate 9. The insulating plate 9 may comprise an air cushion in a cavity or the like to provide temperature separation between the backside 3a" and exhaust gas recirculate. Said another way, the insulating plate 9 may by formed by an air cushion in a cavity. The thermal conductivity or the heat permeability of the flap 3 is greatly reduced by means of the insulating plate 9. In some examples, the insulating plate 9 may block EGR flow from contacting the flap 3a. In one example, the insulating plate 9 prevents EGR from contacting the flap 3a such that only intake air contacts a front side 3a' of the flap 3a. As such, a temperature of the flap 3a and the insulating plate 9 may be different. By thermally separating the flap 3a from the insulating plate 9, condensate is less likely to form on the back side 3a" of the flap 3a. This may result in more efficient compressor operation (e.g., over a greater range of operating conditions, less degradation, and the like).

The insulating plate 9 may be equal to or greater than a length of the flap 3a. Said another way, the insulating plate 9 is the same length or longer than the flap 3a. This may allow the insulating plate 9 to completely stop EGR from touching the back side 3a" of the flap 3a. In some examples, the back side 3a" may no longer comprise the second sealing element 4b since the back side 3a" may no contact surfaces of the junction 5b due to the arrangement of the insulating plate 9.

The sealing elements 4 may comprise of a material different from a material of the insulating plate 9. Additionally, the sealing elements 4 are shown physically coupled directly to and in face-sharing contact with one or more of the front side 3a' and the back side 3a" of the flap 3a. However, the insulating plate 9 is shown physically coupled to mounting 3c, slightly spaced away from the flap 3a. As such, there is a gap for air to flow between the flap 3a and the insulating plate 9.

Turning now to an embodiment of a valve housing of a valve such as the flap valve 3a described above, the supercharged internal combustion engine may further comprise an intake system for the supply of a charge-air flow, an exhaust-gas discharge system for the discharge of exhaust gas, at least one compressor arranged in the intake system, which compressor is equipped with at least one impeller which is mounted, in a compressor housing, on a rotatable shaft, an exhaust-gas recirculation arrangement comprising a recirculation line which branches off from the exhaust-gas discharge system and which opens into the intake system upstream of the at least one impeller so as to form a junction point, the recirculation line branching off upstream of a turbine arranged in the exhaust-gas discharge system, and a valve unit which is arranged at the junction point in the intake system and which comprises a valve housing and a flap arranged in the valve housing, the flap being pivotable about an axis running transversely with respect to the fresh-air flow, in such a way that the flap, in a first end position, blocks the intake system by means of a front side and opens up the recirculation line, and, in a second end position, covers the recirculation line by means of a back side and opens up the intake system, which internal combustion engine is distinguished by the fact that, between the compressor housing and the valve housing, a connection is formed using at least one spacer element and at least one sealing element.

According to the disclosure, the connection between the compressor housing and the valve housing is formed using at least one spacer element and at least one sealing element. These two measures or elements have numerous advantageous effects.

The connection according to the disclosure between the compressor housing and the valve housing is not a rigid connection but is rather a floating mounting of the valve housing, with play, on the compressor housing, wherein the compressor housing and the valve housing are held at a distance from one another using at least one spacer element. In this way, both the introduction of shocks from the compressor housing into the valve housing and the introduction of shocks from the valve housing into the compressor housing are suppressed.

The valve unit and the compressor, or the valve housing and the compressor housing, are decoupled from one another in terms of vibrations by means of the spacer element and the sealing element, whereby the different vibration characteristics, or the different natural frequencies, of the interconnected components are allowed for.

In the context of the concept according to the disclosure, the spacer element may secondarily also have a sealing function, and the sealing element may secondarily have a spacer function.

The primary purpose of the sealing element is however that of sealing off the intake system with respect to the surroundings, that is to say preventing the escape of charge air or exhaust gas into the surroundings.

In this way, the object on which the disclosure is based is achieved, that is to say a supercharged internal combustion engine is provided which is improved in relation to the prior art with regard to durability and acoustic characteristics, in particular noise emissions.

In the context of the exhaust-gas recirculation, it is preferable for exhaust gas that has been subjected to exhaust-gas aftertreatment, in particular in a particle filter, to be conducted through the compressor. In this way, depositions in the compressor which change the geometry of the compressor, in particular the flow cross sections, and impair the efficiency of the compressor, can be prevented.

Embodiments of the supercharged internal combustion engine may comprise the axis is arranged close to the edge, that is to say close to an edge section of the flap. In this embodiment, the flap is laterally mounted and pivotable similarly to a door, specifically at one of its edges. This distinguishes the flap according to the disclosure from centrally mounted shut-off elements or flaps, such as for example a butterfly valve.

Embodiments of the supercharged internal combustion engine may comprise the axis is arranged close to the wall, that is to say close to a wall section of the intake system. The intake system generally performs, with regard to the flap, the function of a frame, that is to say borders the flap. In this respect, an embodiment in which the axis is arranged close to an edge section of the flap is generally also an embodiment in which the axis is arranged close to a wall section of the intake system. The major advantage of both embodiments is that, in the second end position, the flap is positioned close to the wall, such that a completely free passage for the fresh air is realized.

Embodiments of the supercharged internal combustion engine may comprise the at least one spacer element holds the compressor housing and the valve housing at a distance from one another in the direction of the compressor shaft. The connection of the valve housing to the compressor housing is a plug-action connection, that is to say, during the assembly process, the valve housing is plugged onto the compressor housing, specifically generally in the direction of the compressor shaft, which advantageously also constitutes or predefines the main flow direction of the charge-air flow. Consequently, the valve housing and the compressor housing may, for assembly purposes, be displaceable relative to one another in the direction of the compressor shaft, for which reason a spacer element as an intermediate element, which holds the compressor housing and the valve housing at a distance from one another in the direction of the compressor shaft, that is to say in the direction of the displacement travel, is expedient.

For the reasons stated above, embodiments of the supercharged internal combustion engine are also advantageous in which the at least one spacer element is arranged between a face side of the compressor housing and a face side of the valve housing, the face sides being oriented in each case transversely, preferably perpendicularly, with respect to the compressor shaft.

Embodiments of the supercharged internal combustion engine may comprise the at least one sealing element seals off the compressor housing and the valve housing in a plane which is oriented transversely, in particular perpendicularly, with respect to the compressor shaft.

Embodiments of the supercharged internal combustion engine may comprise the at least one sealing element holds the compressor housing and the valve housing at a distance from one another transversely, preferably perpendicularly, with respect to the compressor shaft.

Embodiments of the supercharged internal combustion engine may comprise the at least one spacer element and the at least one sealing element form a monolithic component. In this way, the number of components is reduced, whereby, in turn, the assembly process is shortened and simplified.

In this context, embodiments of the supercharged internal combustion engine may comprise the monolithic component is of L-shaped form.

Embodiments of the supercharged internal combustion engine may comprise the at least one spacer element and the at least one sealing element constitute separate components.

In this context, embodiments of the supercharged internal combustion engine may comprise the at least one spacer element and/or the at least one sealing element is a ring. A ring-shaped element simplifies the assembly process and reduces the risk of assembly errors, because the orientation of the element can be disregarded.

Embodiments of the supercharged internal combustion engine may comprise the connection between the compressor housing and the valve housing constitutes a floating mounting of the valve housing, with play, on the compressor housing.

Embodiments of the supercharged internal combustion engine may comprise the valve housing has not only the connection to the compressor housing but also a further connection, which serves as a fastening, to another component, said other component not being the intake system and not being the recirculation line. The other component is preferably a supporting structure in the engine bay of the motor vehicle, for example a beam or a closure panel.

Here, embodiments of the supercharged internal combustion may comprise the valve housing is mounted using the fastening at the center of gravity of the valve unit. Then, the weight force, which acts at the center of gravity, does not generate any moments about the fastening, whereby the connection between the valve housing and the compressor housing is also relieved of load.

Embodiments of the supercharged internal combustion engine may comprise at least one exhaust-gas turbocharger is provided which comprises a turbine arranged in the exhaust-gas discharge system and a compressor arranged in the intake system. With regard to the above embodiment, reference is made to the statements already made in conjunction with the exhaust-gas turbocharging arrangement, in particular the highlighted advantages.

In this context, embodiments of the supercharged internal combustion engine may comprise the at least one compressor is the compressor of the at least one exhaust-gas turbocharger.

Embodiments of the supercharged internal combustion engine may comprise the at least one compressor is a radial compressor. This embodiment permits dense packaging with regard to the supercharging arrangement. The compressor housing may be configured as a spiral or worm housing. In the case of an exhaust-gas turbocharger, the diversion of the charge-air flow in the compressor of the exhaust-gas turbocharger can advantageously be utilized for conducting the compressed charge air on the shortest path from the outlet side, on which the turbine of the exhaust-gas turbocharger is commonly arranged, to the inlet side.

In this connection, embodiments may comprise the turbine of the at least one exhaust-gas turbocharger is a radial turbine. This embodiment likewise permits dense packaging of the exhaust-gas turbocharger and thus of the supercharging arrangement as a whole.

By contrast to turbines, compressors are defined in terms of their exit flow. A radial compressor is thus a compressor whose flow exiting the rotor blades runs substantially radially. In the context of the present disclosure, "substantially radially" means that the speed component in the radial direction is greater than the axial speed component.

Embodiments of the supercharged internal combustion engine may comprise the at least one compressor is of axial type of construction. The flow exiting the impeller blades of an axial compressor runs substantially axially.

Embodiments of the supercharged internal combustion engine may comprise the at least one compressor has an inlet region which runs coaxially with respect to the shaft of the at least one impeller and which is designed such that the flow of charge air approaching the at least one impeller runs substantially axially.

In the case of an axial inflow to the compressor, a diversion or change in direction of the charge-air flow in the intake system upstream of the at least one impeller is often omitted, whereby unnecessary pressure losses in the charge-air flow owing to flow diversion are avoided, and the pressure of the charge air at the inlet into the compressor is increased. The absence of a change in direction also reduces the contact of the exhaust gas and/or charge air with the internal wall of the intake system and/or with the internal wall of the compressor housing, and thus reduces the heat transfer and the formation of condensate.

In the case of at least one exhaust-gas turbocharger being used, embodiments of the supercharged internal combustion engine may comprise the recirculation line branches off from the exhaust-gas discharge system downstream of the turbine of the at least one exhaust-gas turbocharger, in the manner of a low-pressure EGR arrangement.

In contrast to a high-pressure EGR arrangement, in which exhaust gas extracted from the exhaust-gas discharge system upstream of the turbine is introduced into the intake system, specifically preferably downstream of the compressor, in the case of a low-pressure EGR arrangement exhaust gas which has already flowed through the turbine is recirculated to the inlet side. For this purpose, the low-pressure EGR arrangement comprises a recirculation line which branches off from the exhaust-gas discharge system downstream of the turbine and which opens into the intake system upstream of the compressor.

The low-pressure EGR arrangement in relation to the high-pressure EGR arrangement is that the exhaust-gas flow introduced into the turbine during exhaust-gas recirculation is not reduced by the recirculated exhaust-gas flow rate. The entire exhaust-gas flow is always available at the turbine for generating an adequately high charge pressure.

The exhaust gas which is recirculated via the low-pressure EGR arrangement to the inlet side, and preferably cooled, is mixed with fresh air upstream of the compressor. The mixture of fresh air and recirculated exhaust gas produced in this way forms the charge air or combustion air which is supplied to the compressor and compressed.

Embodiments of the supercharged internal combustion engine may comprise a first shut-off element is arranged in the exhaust-gas discharge system downstream of the branching point of the recirculation line. The first shut-off element can be used for increasing the exhaust-gas pressure upstream of the shut-off element in the exhaust-gas discharge system, and can thus be utilized for increasing the pressure gradient between the exhaust-gas discharge system and the intake system. This offers advantages in particular in the case of high recirculation rates, which require a greater pressure gradient.

Embodiments of the supercharged internal combustion engine may comprise second shut-off element is arranged in the intake system upstream of the junction point. The second shut-off element serves, at the inlet side, for reducing the pressure in the intake system, and is thus—like the first shut-off element—conducive to increasing the pressure gradient between the exhaust-gas discharge system and the intake system.

In this context, embodiments of the supercharged internal combustion engine may comprise the first and/or second shut-off element is a pivotable or rotatable flap.

To improve the torque characteristic of the supercharged internal combustion engine, it may comprise two or more exhaust-gas turbochargers, for example multiple exhaust-gas turbochargers connected in series. By connecting two exhaust-gas turbochargers in series, of which one exhaust-gas turbocharger serves as a high-pressure stage and one exhaust-gas turbocharger serves as a low-pressure stage, the compressor characteristic map can advantageously be expanded, specifically both in the direction of smaller compressor flows and also in the direction of larger compressor flows.

In particular, with the exhaust-gas turbocharger which serves as a high-pressure stage, it is possible for the surge limit to be shifted in the direction of smaller compressor flows, as a result of which high charge pressure ratios can be obtained even with small compressor flows, which considerably improves the torque characteristic in the lower engine speed range. This is achieved by designing the high-pressure turbine for small exhaust-gas mass flows and by providing a bypass line by means of which, with increasing exhaust-gas mass flow, an increasing amount of exhaust gas is conducted past the high-pressure turbine.

Furthermore, the torque characteristic may be improved by means of multiple turbochargers arranged in parallel, that is to say by means of multiple turbines of relatively small turbine cross section arranged in parallel, wherein turbines are activated successively with increasing exhaust-gas flow rate.

A shift of the surge limit toward smaller charge-air flows is also possible in the case of turbochargers arranged in parallel, such that, in the presence of low charge-air flow rates, it is possible to provide charge pressures high enough to thereby ensure a satisfactory torque characteristic of the internal combustion engine at low engine speeds.

Furthermore, the response behavior of an internal combustion engine supercharged in this way is considerably improved in relation to a similar internal combustion engine with a single exhaust-gas turbocharger, because the relatively small turbines are less inert, and the rotor of a smaller-dimensioned turbine and of a smaller-dimensioned compressor can be accelerated more rapidly.

Embodiments of the supercharged internal combustion engine may comprise the valve unit is additionally equipped with a valve which comprises a valve body which is connected, and thereby mechanically coupled, to the flap, a pivoting of the flap causing an adjustment of the valve in space, and the valve body either opening up or shutting off the recirculation line. The flap can consequently serve as an actuating device for the valve.

All variants of the above embodiments have in common the fact that the flap serves only for the setting of the air flow rate supplied via the intake system, and not for the metering of the recirculated exhaust-gas flow rate. The latter is effected by way of the valve, which, in the shutting-off state, is inserted in the recirculation line and serves as an EGR valve.

Embodiments of the supercharged internal combustion engine may comprise the junction point is formed and arranged in the vicinity of, at a distance $\Delta$ from, the at least one impeller. An arrangement of the junction point close to the compressor shortens the path for the hot recirculated exhaust gas from the point at which it is introduced into the intake system to the at least one impeller, such that the time available for the formation of condensate droplets in the free charge-air flow is reduced. A formation of condensate droplets is thus counteracted in this way.

Furthermore, a swirl introduced into the flow using the flap remains effective, that is to say is still pronounced, at the point at which the charge air enters the impeller. Specifically, embodiments may comprise the flap is not planar and has at least one deformation, as an unevenness, at least on the front side. The deformation of the flap gives rise to expedient flow effects. A substantially axial charge-air flow or fresh-air flow can have a speed component transverse with respect to the shaft of the compressor, that is to say a swirl, forcibly imparted to it by means of the flap. In this way, the surge limit of the compressor can be shifted toward smaller charge-air flows, whereby relatively high charge pressure ratios are achieved even in the case of small charge air flows.

In this connection, embodiments may comprise for the distance $\Delta$, the following applies: $\Delta \leq 2.0 D_V$ or $\Delta \leq 1.5 D_V$, where $D_V$ denotes the diameter of the at least one impeller. Embodiments are advantageous in which, for the distance $\Delta$, the following applies: $\Delta \leq 1.0 D_V$, preferably $\Delta \leq 0.75 D_V$.

FIG. 4A schematically shows, in a side view, the compressor 12, arranged in the intake system 11, of a first embodiment of the internal combustion engine together with exhaust-gas recirculation arrangement 15 and valve unit 13, partially in section. In one example, the intake system 11 and the valve unit 13 may be used substantially similarly to the intake system 1 and valve unit 3 of FIG. 1A.

For the supply of the charge air to the cylinders, the internal combustion engine has an intake system 11, and, for the supercharging of the cylinders, an exhaust-gas turbocharger is provided which comprises a turbine (not illustrated) arranged in the exhaust-gas discharge system and a compressor 12 arranged in the intake system 11. The compressor 12 is a radial compressor 12b, in the housing 12c of which an impeller 12e mounted on a rotatable shaft 12d rotates. The shaft 12d of the impeller 12e lies in the plane of the drawing of FIG. 4A, and runs horizontally parallel to a central axis 199.

The compressor 12 of the exhaust-gas turbocharger has an inlet region 12a which runs, and is formed, coaxially with respect to the shaft 12d of the compressor 12, such that the section of the intake system 11 upstream of the compressor 12 does not exhibit any changes in direction, and the flow of charge air approaching the compressor 12 of the exhaust-gas turbocharger, or the impeller 12e thereof, runs substantially axially.

The internal combustion engine is furthermore equipped with an exhaust-gas recirculation arrangement 15 which comprises a recirculation line 15a which branches off from the exhaust-gas discharge system downstream of the turbine and which opens into the intake system 11, so as to form a junction point 15b, upstream of the compressor 12 and the compressor impeller 12e. In the present case, the junction point 15b is arranged close to, at a small distance from, the compressor 12.

At the junction point 15b there is arranged a valve unit 13 which comprises a valve housing 13d and a flap 13a arranged in the valve housing 13d.

An EGR valve 16 which is likewise positioned in the valve housing 13d serves for the adjustment of the recirculated exhaust-gas flow rate. The EGR valve 16 comprises a valve body 16a which covers the recirculation line 15a in the illustrated position and which is connected to the pivotable flap 13a and thereby mechanically coupled to the flap 13a, a pivoting of the flap 13a causing an adjustment of the valve body 16a, that is to say a movement or rotation of the valve body 16a, in space. Consequently, the flap 13a serves as an actuating device for the valve 16 or the valve body 16a.

The flap 13a is pivotable about an axis 13b running transversely with respect to the fresh-air flow. Said axis 13b, which runs transversely with respect to the fresh-air flow and about which the flap 13a is pivotable, is perpendicular to the plane of the drawing. In the present case, said axis 13b is arranged close to an edge section of the flap 13a and close to a wall section of the intake system 11, such that the flap 13a is laterally mounted, similarly to a door.

FIG. 4A shows the flap 13a in two different pivoting positions. In a first end position, in which the flap 13a is perpendicular to the virtual elongation of the compressor shaft 12d (similar to first position 8a of FIG. 1A), the flap 13a, by means of its front side 13a', blocks the intake system 11. In a second end position, in which the flap 13a extends parallel to the virtual elongation of the compressor shaft 12d, the back side 13a'' of the flap 13a covers the recirculation line 15a of the exhaust-gas recirculation arrangement 15, whereas the intake system 11 is opened up. The valve 6 itself is illustrated only for the flap 3a situated in the second end position.

A pivoting movement of the flap 13a is linked to an adjustment of the valve body 16a of the EGR valve 16, wherein the flap 13a serves only for the setting of the air flow rate supplied via the intake system 11, and not for the metering of the recirculated exhaust-gas flow rate. The latter is performed by the EGR valve 16.

FIG. 4B shows a connection 14 between the compressor housing 12c and the valve housing 13d.

The connection 14 between the compressor housing 12c and the valve housing 13d comprises a spacer element 14a, which holds the housings 12c, 13d at a distance from one another in the direction of the compressor shaft, and two housing sealing elements 14b in the form of rings.

The spacer element 14a is arranged between a face side of the compressor housing 12c and a face side of the valve housing 13d. In the present case, the face sides are oriented perpendicular to the compressor shaft 12d.

The ring-shaped sealing elements 14b seal off the connection 14 in a plane perpendicular to the compressor shaft.

Turning now to FIG. 5, it shows a schematic diagram of a vehicle system 200 with a multi-cylinder engine system 100 coupled in a motor vehicle in accordance with the present disclosure. As depicted in FIG. 5, internal combustion engine 100 includes a controller 120 which receives inputs from a plurality of sensors 230 and sends outputs from a plurality of actuators 232. Engine 100 further includes cylinders 114 coupled to intake passage 146 and exhaust passage 148. Intake passage 146 may include throttle 162. In one example, the throttle 162 may be used similarly to flap 3a of FIG. 1A. Exhaust passage 148 may include emissions control device 178. Engine 100 is shown as a boosted engine, coupled to a turbocharger with compressor 174 connected to turbine 176 via shaft 180. In one example, the compressor and turbine may be coupled within a twin scroll turbocharger. In another example, the turbocharger may be a variable geometry turbocharger, where turbine geometry is actively varied as a function of engine speed and other operating conditions. The compressor 174 and shaft 180 may be used similarly to compressor 12 and rotatable shaft 12d of FIG. 4A.

The compressor 174 is coupled to charge air cooler (CAC) 218. The CAC 218 may be an air-to-air or air-to-water heat exchanger, for example. From the compressor 174, the hot compressed air charge enters the inlet of the CAC 218, cools as it travels through the CAC, and then exits to the intake manifold 146. Ambient airflow 216 from outside the vehicle may enter engine 10 and pass across the CAC 218 to aid in cooling the charge air. A compressor bypass line 217 with a bypass valve 219 may be positioned between the inlet of the compressor and outlet of the CAC 218. The controller 120 may receive input from compressor inlet sensors such as compressor inlet air temperature, inlet air pressure, etc., and may adjust an amount of boosted aircharge recirculated across the compressor for boost control.

Intake passage 146 is coupled to a series of cylinders 114 through a series of intake valves. The cylinders 114 are further coupled to exhaust passage 148 via a series of exhaust valves. In the depicted example, a single intake passage 146 and exhaust passage 148 are shown. In another example, the cylinders may include a plurality of intake passages and exhaust passages to form an intake manifold and exhaust manifold respectively. For example, configurations having a plurality of exhaust passages may enable effluent from different combustion chambers to be directed to different locations in the engine system.

The exhaust from exhaust passage 148 is directed to turbine 176 to drive the turbine. When a reduced turbine torque is desired, some exhaust may be directed through a wastegate (not shown) to bypass the turbine. The combined flow from the turbine and wastegate flows through the emission control device 178. One or more aftertreatment devices may be configured to catalytically treat the exhaust flow, thereby reducing an amount of one or more substances in the exhaust. The treated exhaust may be released into the atmosphere via exhaust conduit 235.

An LP-EGR line 251 is arranged to capture a portion of exhaust gas between the turbine 176 and the emission control device 178. The LP EGR line 251 may be used substantially similarly to the recirculation line 5 of FIG. 1A. A cooler 250 is along in the LP-EGR line 251 and configured to lower a temperature of LP-EGR in a manner similar to that described for the CAC 218. In some examples, the LP-EGR line 251 may further comprise a cooler bypass configured to direction LP-EGR around the cooler 250 when cooling is not desired. EGR valve 6 may adjust an amount of LP-EGR flowing to the intake passage 146. In one example, LP-EGR may only flow to the intake passage 146 when the EGR valve 6 is at least partially open and the throttle 162 is outside of a fully open position (e.g., the second position 8b of FIG. 1A).

In this way, a combination valve comprising a flap with one or more sealing elements may be used to increase a seal formed between the flap and an intake passage. The sealing element may be positioned on both a front side and a back side of the flap. The technical effect of arranging the sealing element on both the front and back sides of the flap is to improve a seal between the flap and the intake passage and the flap and an exhaust gas recirculate passage. The sealing elements may additionally reduce an impact noise generated when the flap contact a surface within the intake passage. In this way, a seal may be improved while simultaneously reducing noises generated by the flap when it is moved to the first and second positions.

In a first embodiment, a supercharged internal combustion engine comprises an intake system for the supply of a charge-air flow, an exhaust-gas discharge system for the discharge of exhaust gas, at least one compressor arranged in the intake system, which compressor is equipped with at least one impeller which is mounted, in a housing, on a rotatable shaft, an exhaust-gas recirculation arrangement comprising a recirculation line which branches off from the exhaust-gas discharge system and which opens into the intake system, so as to form a junction point, upstream of the at least one impeller, and a valve unit which is arranged at the junction point in the intake system and which comprises a valve housing and a flap arranged in the valve housing, the flap, which is delimited circumferentially by an edge, being pivotable about an axis running transversely with respect to the fresh-air flow, in such a way that the flap, in a first end position, blocks the intake system by means of a front side and opens up the recirculation line and, in a second end position, covers the recirculation line by means of an exhaust-gas-side back side and opens up the intake system, wherein the front side of the flap, in the first end position, interacts with a stop in the intake system, which stop is arranged upstream of the flap, in order to block the intake system, the flap being equipped, at least on the front side, with at least one sealing element which, in the first end position of the flap, presses against the stop for the purposes of sealing off the intake system. A first example of the supercharged internal combustion engine comprises an intake system further includes where the axis is arranged close to an edge section of the flap, adjacent a wall section of the intake system. A second example of the supercharged internal combustion engine comprises an intake system, optionally including the first example, further includes where the front side of the flap is covered by a first sealing element, and where the back side of the flap is covered by a second sealing element, the first sealing element being identical to the second sealing element. A third example of the supercharged internal combustion engine comprises an intake system, optionally including the first and/or second examples, further includes where the first sealing element and the second sealing element have a strip-like form, where the first sealing element is arranged along a circumferential edge of the front side and where the second sealing element is arranged along a circumferential edge of the back side, and where the front side and the back side are planar. A fourth example of the supercharged internal combustion engine comprises an intake system, optionally including one or more of the first through third examples, further includes where one or more of the first sealing element and the second sealing element is a bead-like sealing lip and further comprises a U-shaped cross-section taken along a direction of intake air flow. A fifth example of the supercharged internal combustion engine comprises an intake system, optionally including one or more of the first through fourth examples, further includes where the bead-like sealing lip has a triangular cross section. A sixth example of the supercharged internal combustion engine comprises an intake system, optionally including one or more of the first through fifth examples, further includes where one or more of the first sealing element and the second sealing element are elastically deformable. A seventh example of the supercharged internal combustion engine comprises an intake system, optionally including one or more of the first through sixth examples, further includes where one or more of the first sealing element and the second sealing element are comprised of a non-deformable carrier structure.

An embodiment of a system comprises a valve close-coupled to a compressor at a junction between an intake passage, an exhaust gas recirculate passage, and a compressor inlet, where the valve comprises a circular sealing element along its circumferential edge spaced away from a geometric center on a side of the valve. A first example of the system further includes where the side is a front side and the circular sealing element is a first circular sealing element, and where the valve further comprises a second circular sealing element arranged along the circumferential edge and spaced away from the geometric center on a back side of the valve. A second example of the system, optionally including the first example the first circular sealing element and the second circular sealing element are separate and do not touch. A third example of the system, optionally including the first and/or second examples, further includes where the circular sealing element is flush with a surface of the side of the valve. A fourth example of the system, optionally including the first through third examples, further includes where the circular sealing element extends beyond a profile of the side of the valve, and where the circular sealing element is the first portion of the valve to contact a stop of the intake passage. A fifth example of the system, optionally including the first through fourth examples, further includes where a cross-section of the circular sealing element taken along a direction of intake air flow is U-shaped. A sixth example of the system, optionally including the first through fifth examples, further includes where a cross-section of the circular sealing element taken along a direction of intake air flow is triangle shaped. A seventh example of the system, optionally including the first through sixth examples, further includes where the valve is arranged in a valve housing, the valve housing being close-coupled to the compressor, where being close-coupled includes being within 0.75 times a diameter of an impeller of the compressor.

An embodiment of an intake system comprising an intake passage configured to direct one or more gases to a compressor, an exhaust gas passage coupled to the intake passage upstream of the compressor, a flap valve arranged at a junction between the intake passage, the exhaust gas passage, and a compressor inlet, and a first sealing element arranged on a front side of the flap valve and a second sealing element arranged on a back side of the flap valve, where the first and second sealing elements are arranged along a circumferential edge of the front and back sides, respectively, and are spaced away from a geometric center of the flap valve. A first example of the intake system further includes where the flap valve is circular and is configured to pivot to a first position, a second position, and one or more positions therebetween, where the first position corresponds to the flap valve being perpendicular to a direction of intake air flow and further comprises the first sealing element being pressed against a stop of the intake passage, and where the second position corresponds to the flap valve being passage to the direction of intake air flow and further comprises the second sealing element being pressed against a wall of the junction. A second example of the intake system, optionally including the first example, further includes where the first sealing element contacts only intake air flow and the second sealing element contacts only exhaust gas recirculate. A third example of the intake system, optionally including the first and/or second examples further includes where the first sealing element and the second sealing element are circular and identical.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein. The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:
1. A supercharged internal combustion engine having:
an intake system for supply of a charge-air flow;
an exhaust-gas discharge system for discharge of exhaust gas;
at least one compressor arranged in the intake system, the compressor equipped with at least one impeller which is mounted, in a housing, on a rotatable shaft;
an exhaust-gas recirculation arrangement comprising a recirculation line which branches off from the exhaust-gas discharge system and which opens into the intake system, so as to form a junction point, upstream of the at least one impeller; and
a valve unit which is arranged at the junction point in the intake system and which comprises a valve housing and a flap arranged in the valve housing, the flap, which is delimited circumferentially by an edge, being pivotable about an axis running transversely with respect to a fresh-air flow, in such a way that the flap, in a first end position, blocks the intake system by means of a front side and opens up the recirculation line and, in a second end position, covers the recirculation line by means of an exhaust-gas-side back side and opens up the intake system, wherein the front side of the flap, in the first end position, interacts with a stop in the intake system, the stop arranged upstream of the flap, in order to block the intake system, the flap being equipped, at least on the front side, with at least one sealing element which, in the first end position of the flap, presses against the stop for the purposes of sealing off the intake systems; wherein the valve housing further comprises an EGR valve distally coupled to the back side of the flap.

2. The supercharged internal combustion engine of claim 1, wherein the axis is arranged close to an edge section of the flap, adjacent a wall section of the intake system.

3. The supercharged internal combustion engine of claim 1, wherein the front side of the flap is covered by a first sealing element of the at least one sealing element, and wherein the back side of the flap is covered by a second sealing element, the first sealing element being identical in shape, size, and material to the second sealing element.

4. The supercharged internal combustion engine of claim 3, wherein the first sealing element and the second sealing element are strip shaped, wherein the first sealing element is arranged along a circumferential edge of the front side and where the second sealing element is arranged along a circumferential edge of the back side, and wherein the front side and the back side are planar.

5. The supercharged internal combustion engine of claim 3, wherein the first sealing element and the second sealing element are bead sealing lips and further comprise a U-shaped cross-section taken along a direction of intake air flow.

6. The supercharged internal combustion engine of claim 3, wherein the bead sealing lips have a triangular cross section.

7. The supercharged internal combustion engine of claim 3, wherein the first sealing element and the second sealing element are elastically deformable.

8. The supercharged internal combustion engine of claim 3, wherein the first sealing element and the second sealing element are comprised of a non-deformable carrier structure, and wherein the non-deformable carrier structure is the flap.

9. An intake system for a supercharged internal combustion engine comprising:
   an intake passage of the supercharged internal combustion engine configured to direct one or more gases to a compressor;
   an exhaust gas passage coupled to the intake passage upstream of the compressor;
   a flap valve arranged at a junction between the intake passage, the exhaust gas passage, and a compressor inlet;
   a first sealing element arranged on a front side of the flap valve and a second sealing element arranged on a back side of the flap valve, where the first and second sealing elements are arranged along a circumferential edge of the front and back sides, respectively, and are spaced away from a geometric center of the flap valve; and
   an EGR valve distally coupled to the back side of the flap.

10. The intake system of claim 9, wherein the flap valve is circular and is configured to pivot to a first position, a second position, and one or more positions therebetween, where the first position corresponds to the flap valve being perpendicular to a direction of intake air flow and further comprises the first sealing element being pressed against a stop of the intake passage, and where the second position corresponds to the flap valve being parallel to the direction of intake air flow and further comprises the second sealing element being pressed against a wall of the junction.

11. The intake system of claim 9, wherein the first sealing element contacts only intake air flow and the second sealing element contacts only exhaust gas recirculate when the flap valve is one of open or closed.

12. The intake system of claim 9, wherein the first sealing element and the second sealing element are circular and identical.

* * * * *